(12) United States Patent
Hoshi

(10) Patent No.: US 6,865,031 B2
(45) Date of Patent: Mar. 8, 2005

(54) IMAGING LENS SYSTEM AND IMAGE TAKING APPARATUS USING THE SAME

(75) Inventor: Koji Hoshi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/364,876

(22) Filed: Feb. 12, 2003

(65) Prior Publication Data

US 2003/0156336 A1 Aug. 21, 2003

(30) Foreign Application Priority Data

Feb. 15, 2002 (JP) .......................................... 2002-038397

(51) Int. Cl.$^7$ .............................................. G02B 9/08
(52) U.S. Cl. .................................... 359/740; 359/708
(58) Field of Search ............................... 359/708, 717, 359/740, 793, 794

(56) References Cited

U.S. PATENT DOCUMENTS

| | | | | |
|---|---|---|---|---|
| 3,731,989 A | * | 5/1973 | Shimizu | 359/753 |
| 3,815,974 A | * | 6/1974 | Momiyama | 359/765 |
| 4,130,349 A | | 12/1978 | Hyakumura | 350/216 |
| 4,146,304 A | | 3/1979 | Tojyo | 350/175 |
| 4,493,537 A | | 1/1985 | Nakahashi | 350/469 |
| 4,674,844 A | | 6/1987 | Nishioka et al. | 350/469 |
| 4,812,027 A | * | 3/1989 | Yanagisawa | 359/755 |
| 4,984,878 A | | 1/1991 | Miyano | 350/469 |
| 5,418,649 A | | 5/1995 | Igarashi | 359/716 |
| 5,587,739 A | * | 12/1996 | Suzuki et al. | 348/347 |
| 5,706,141 A | | 1/1998 | Abe | 359/793 |
| 6,075,658 A | * | 6/2000 | Nagahara | 359/753 |
| 6,417,975 B1 | * | 7/2002 | Isono | 359/783 |
| 6,600,610 B2 | * | 7/2003 | Ohno | 359/770 |

FOREIGN PATENT DOCUMENTS

| | | |
|---|---|---|
| JP | 52-131718 | 11/1977 |
| JP | 58-080611 | 5/1983 |
| JP | 60-37514 | 2/1985 |
| JP | 02-176611 | 2/1990 |
| JP | 5-20724 | 1/1993 |
| JP | 09-189856 | 7/1997 |

* cited by examiner

Primary Examiner—Scott J. Sugarman
Assistant Examiner—Darryl J. Collins
(74) Attorney, Agent, or Firm—Morgan & Finnegan, LLP (57) ABSTRACT

This specification discloses an imaging lens system having a front lens component disposed forwardly and a rear lens component of positive power disposed rearwardly with an aperture stop interposed therebetween. Particularly, it discloses an imaging lens system in which the arrangement, shapes and materials of lenses constituting the front lens component and the rear lens component, a focusing method, etc. are specified from various points of view, whereby which is suitable, for example, as the photo-taking lens of a digital still camera.

23 Claims, 6 Drawing Sheets

IMAGING LENS SYSTEM AND IMAGE TAKING APPARATUS USING THE SAME

BACKGROUND OF THE INVENTION

1. Field of the Invention

This invention relates to an imaging lens system for use as a photo-taking lens or the like, and particularly is suitably used as the photo-taking lens of a camera such as a digital still camera.

2. Description of Related Art

In recent years, digital still cameras have been spreading as the image input apparatuses of computers. In such digital cameras, it is usually practiced to AD-convert an output signal from a solid state image pickup element (photoelectric conversion element) such as a CCD sensor or a CMOS sensor into image data, subject it to a compressing process such as JPEG, and record it in a recording medium such as a flash memory. The compressed data recorded in this manner is evolved on a computer, and thereafter is displayed on a monitor or the like.

In such digital still cameras, the higher definition of a photographed image and the downsizing of the apparatus have become tasks and above all, the compatibility of high resolving power and compactness is required of a photographing optical system. Particularly to provide a thin type camera with importance attached to the portability thereof, a photographing optical system having a short full length is required. To shorten the full length of the optical system, it is advantageous to use a photo-taking lens having the smallest possible number of components.

As photo-taking lenses of long back focal length suitable for digital still cameras, there are known numerous photo-taking lenses of the so-called retrofocus type comprised of a front lens unit of negative power and a rear lens unit of positive power. Particularly as a photo-taking lens of the retrofocus type comprised of a small number of components, there is one of which the front lens unit is comprised of a single negative lens.

As such a photo-taking lens of the retrofocus type of which the front lens unit is comprised of a single negative lens, there is disclosed in U.S. Pat. No. 5,418,649. A photo-taking lens of three-unit three-lens construction comprising, in succession from the object side, a negative lens, a positive lens and a positive lens. In another embodiment in U.S. Pat. No. 5,418,649, there is disclosed a photo-taking lens of three-unit four-lens construction comprising, in succession from the object side, a negative lens, a positive lens and a positive cemented lens.

Further, in Japanese Patent Publication No. 7-122692 (corresponding U.S. Pat. No. 4,984,878), there is disclosed a photo-taking lens of four-unit four lens construction comprising, in succession from the object side, a negative lens, a positive lens, a positive lens and a positive lens. In Japanese Patent Publication No. 5-37288, there is disclosed a photo-taking lens of four-unit four-lens construction comprising, in succession from the object side, a negative lens, a positive lens, a negative lens and a positive lens. In Japanese Patent Publication No. 5-20724, there is disclosed a photo-taking lens of four-unit four-lens construction comprising, in succession from the object side, a negative lens, a positive lens, a positive lens and a negative lens. In Japanese Patent Publication No. 61-46807 (corresponding U.S. Pat. No. 4,493,537), there is disclosed a photo-taking lens of four-unit five-lens construction comprising, in succession from the object side, a negative lens, a positive lens, a positive lens and a positive cemented lens. In Japanese Patent Application Laid-Open No. 9-189856 (corresponding U.S. Pat. No. 5,706,141), there is disclosed a photo-taking lens of four-unit five-lens construction comprising, in succession from the object side, a negative lens, a positive lens, a negative cemented lens and a positive lens. In U.S. Pat. No. 4,146,304, there is disclosed a photo-taking lens of four-unit five-lens construction comprising, in succession from the object side, a negative lens, a positive lens, a positive cemented lens and a positive lens. In U.S. Pat. No. 4,674,844, there is disclosed a photo-taking lens of four-unit five-lens construction comprising, in succession from the object side, a negative lens, a positive lens, a positive cemented lens and a negative lens. In Japanese Patent Publication No. 60-32165 (corresponding U.S. Pat. No. 4,130,349), there is disclosed a photo-taking lens of five-unit five-lens construction comprising, in succession from the object side, a negative lens, a positive lens, a negative lens, a positive lens and a positive lens.

All of the photo-taking lens disclosed in the above-mentioned publications are of the retrofocus type, and in them, the first lens is a negative front lens unit and the second and subsequent lenses constitute a positive rear lens unit.

The above-described conventional photo-taking lenses, however, have been insufficient in both of performance and size as ones for use in the recent digital still cameras of which higher resolution and a smaller size are required.

SUMMARY OF THE INVENTION

So, the present invention has as its object to provide an imaging lens system which is of a novel construction which has never been seen in these examples of the prior art, and which is compact and high in performance and has a wide angle of view and further suffers little from the deterioration of performance due to a manufacturing error.

In order to achieve the above object, the present invention provides an imaging lens system having a front lens component disposed forwardly (on the object side) and a rear lens component of positive power disposed rearwardly (on the image side) with an aperture stop interposed therebetween, characterized in that the arrangement of lenses constituting the respective components, the shapes of the lenses, the materials of the lenses, a focusing method, etc. are specified from various points of view as will be described in embodiments which will be described later.

DESCRIPTION OF THE PREFERRED EMBODIMENTS

Some embodiments of the imaging lens system of the present invention will hereinafter be described with reference to the drawings.

Figure 1:
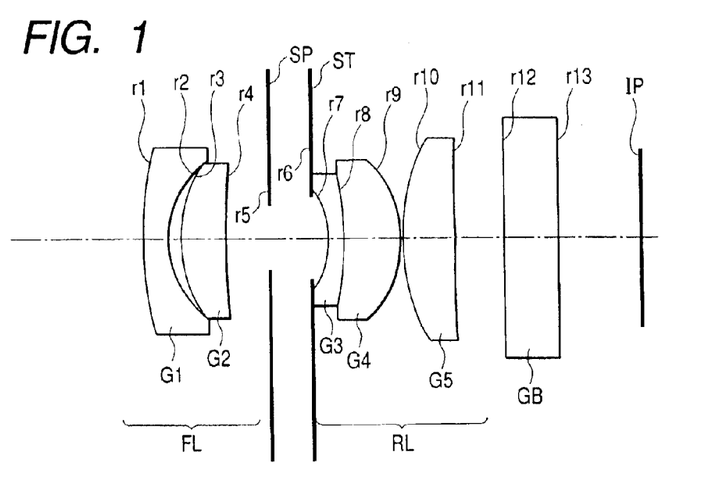
FIG. 1 is a cross-sectional view of the imaging lens system of a first numerical embodiment.
Figure 2:
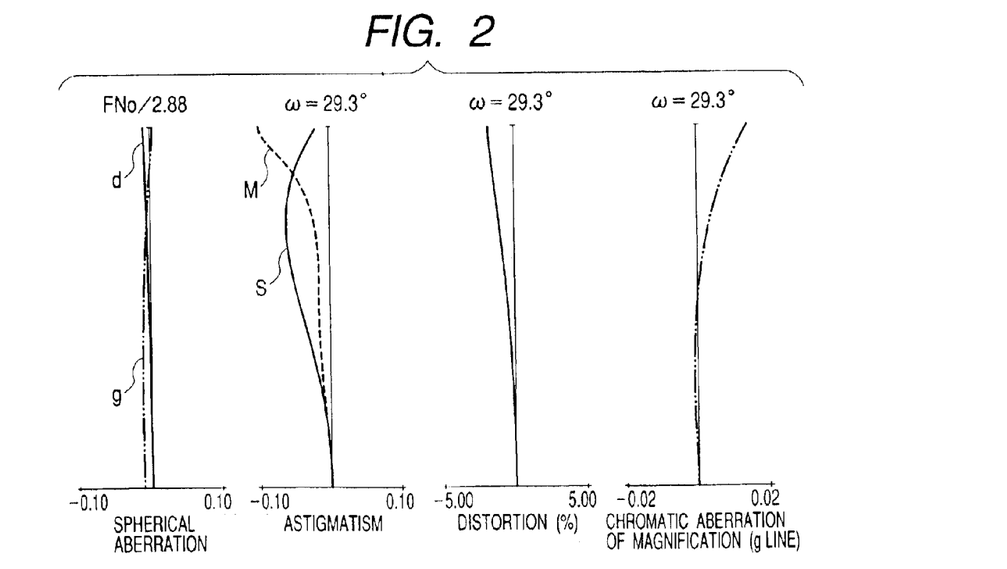
FIG. 2 shows the various aberrations of the imaging lens system of the first numerical embodiment.
Figure 3:
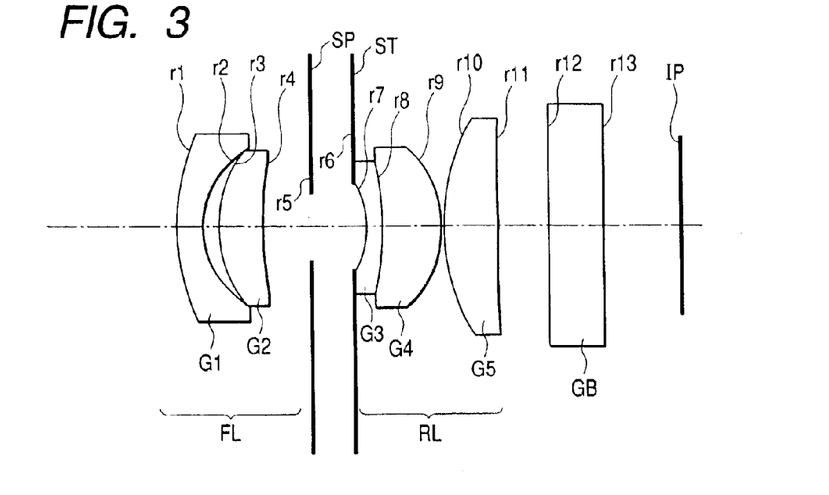
FIG. 3 is a cross-sectional view of the imaging lens system of a second numerical embodiment.
Figure 4:
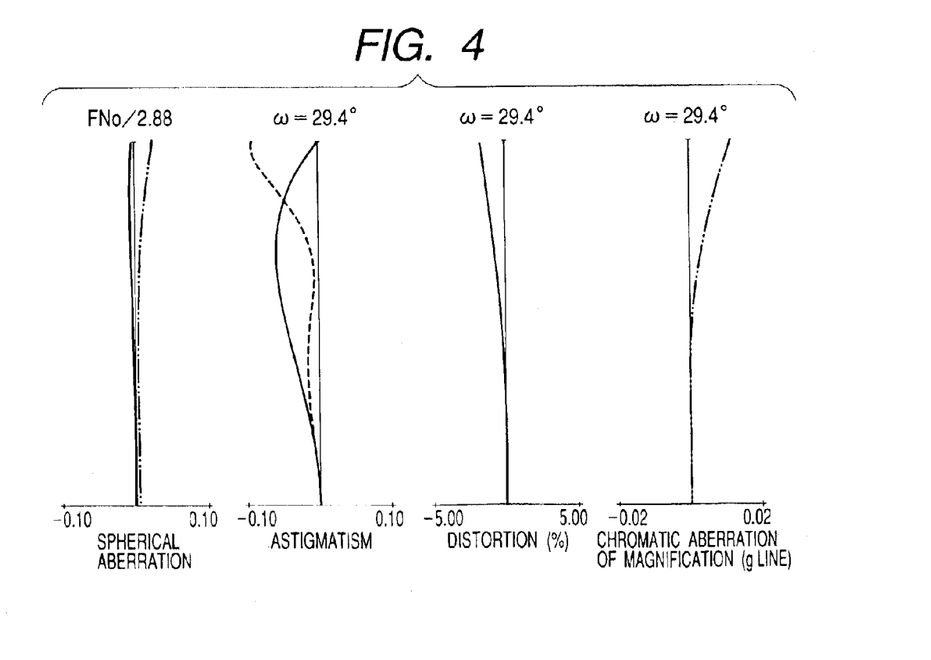
FIG. 4 shows the various aberrations of the imaging lens system of the second numerical embodiment.
Figure 5:
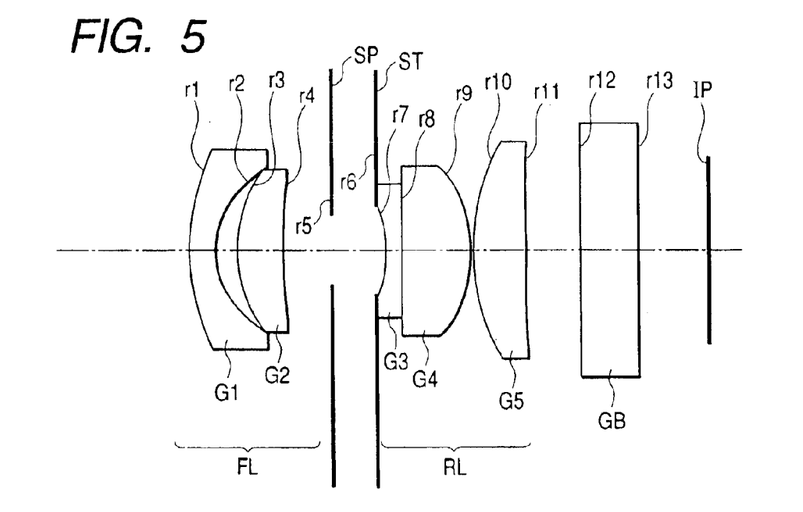
FIG. 5 is a cross-sectional view of the imaging lens system of a third numerical embodiment.
Figure 6:
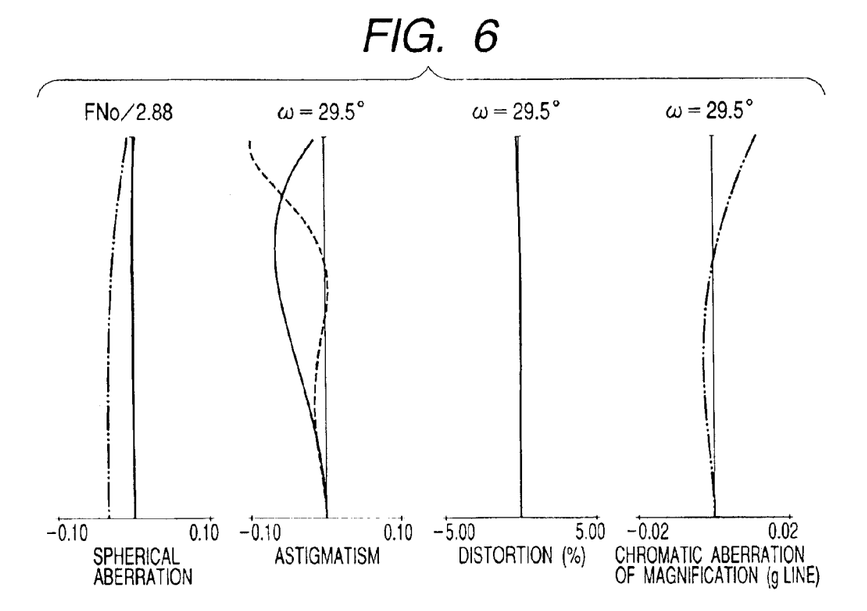
FIG. 6 shows the various aberrations of the imaging lens system of the third numerical embodiment.
Figure 7:
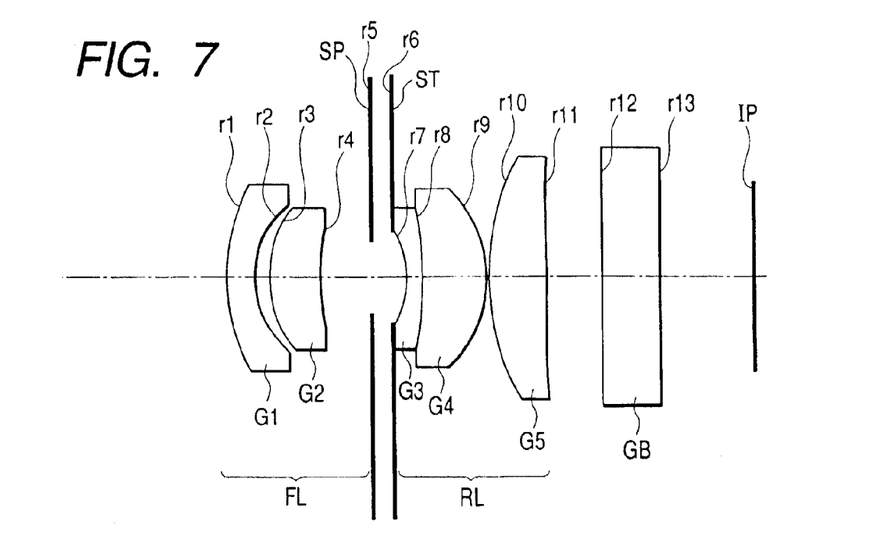
FIG. 7 is a cross-sectional view of the imaging lens system of a fourth numerical embodiment.
Figure 8:
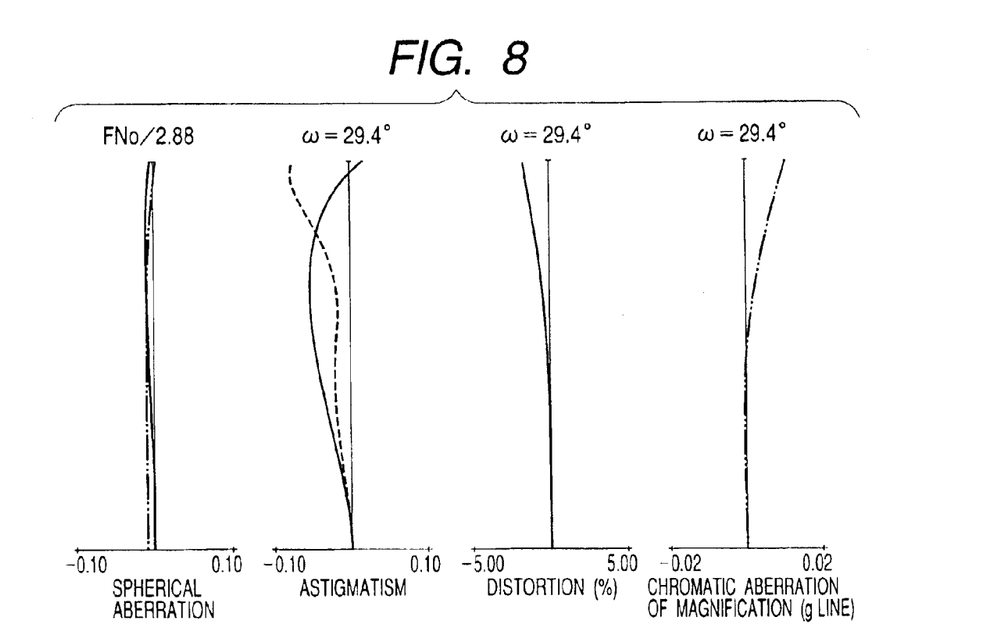
FIG. 8 shows the various aberrations of the imaging lens system of the fourth numerical embodiment.
Figure 9:
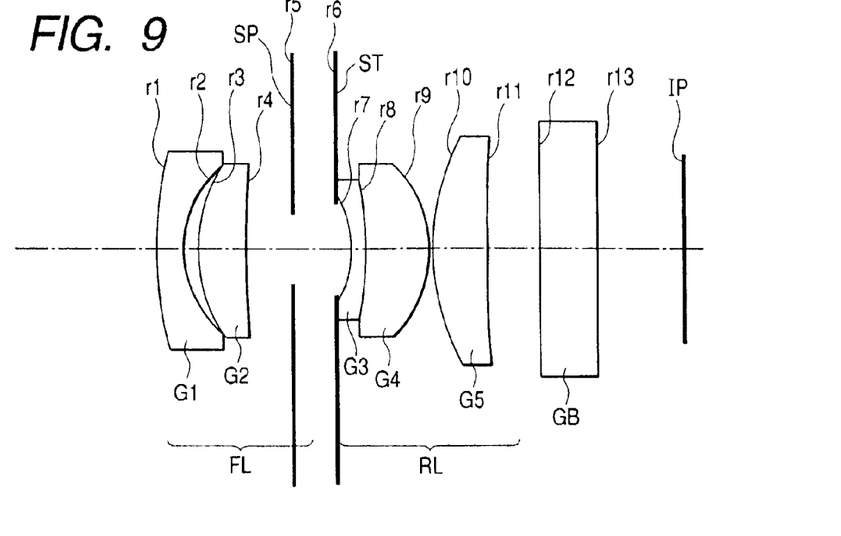
FIG. 9 is a cross-sectional view of the imaging lens system of a fifth numerical embodiment.
Figure 10:
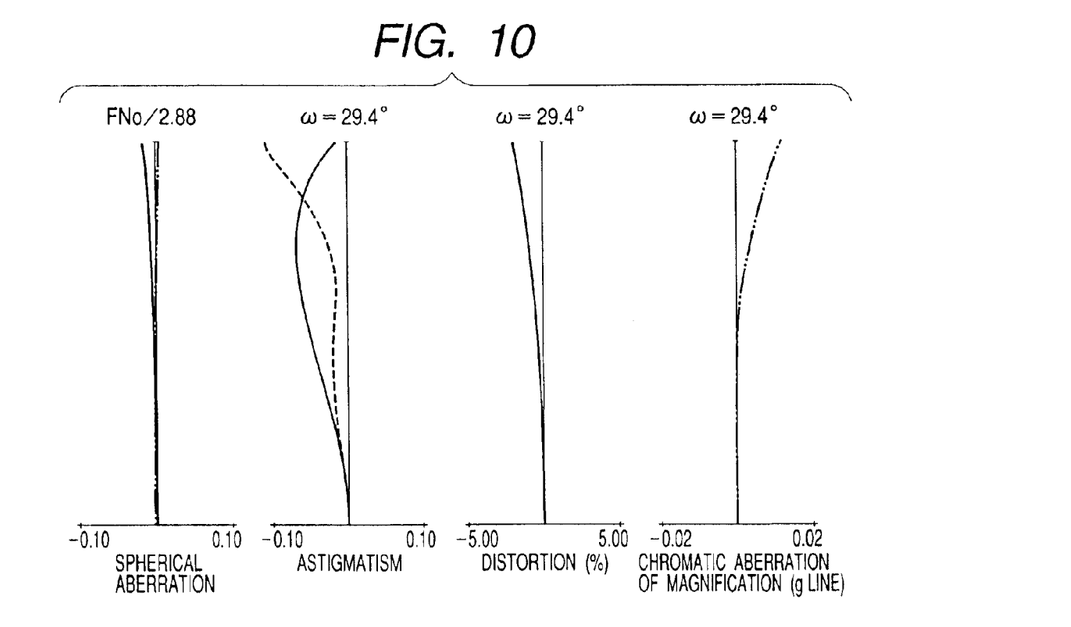
FIG. 10 shows the various aberrations of the imaging lens system of the fifth numerical embodiment.

FIG. 1 is a cross-sectional view of the imaging lens system of a first numerical embodiment which will be described later, and FIG. 2 shows the various aberrations thereof. FIG. 3 is a cross-sectional view of the imaging lens system of a second numerical embodiment which will be described later, and FIG. 4 shows the various aberrations thereof. FIG. 5 is a cross-sectional view of the imaging lens system of a third numerical embodiment which will be described later, and FIG. 6 shows the various aberrations thereof. FIG. 7 is a cross-sectional view of the imaging lens system of a fourth numerical embodiment which will be described later, and FIG. 8 shows the various aberrations thereof. FIG. 9 is a cross-sectional view of the imaging lens system of a fifth numerical embodiment which will be described later, and FIG. 10 shows the various aberrations thereof.

In the cross-sectional views shown in FIGS. 1, 3, 5, 7 and 9, FL designates a front lens component, and RL denotes a rear lens component of positive power (the inverse number of a focal length). The front lens component FL is of positive power in the present embodiment, but may be of negative power. SP designates an aperture stop, and the front lens component FL and the rear lens component RL are disposed on the object side (at the left in the figures, i.e., "forwardly") and the image side (at the right in the figures, i.e., "rearwardly"), respectively, with the aperture stop SP interposed therebetween. ST denotes a flare cut stop (flare stopper) for cutting unnecessary light to prevent flare, and GB designates a glass block corresponding to an optical low-pass filter, an infrared cut filter or the like. IP denotes an image plane on which is disposed the light receiving surface of a solid state image pickup element (photoelectric conversion element) such as a CCD sensor or a CMOS sensor.

The front lens component FL is comprised, in succession from the object side, of a meniscus-shaped negative lens G1 having its concave surface facing the image side, and a meniscus-shaped positive lens G2 having its concave surface facing the image side (the aperture stop SP side). As described above, the front lens component FL is constructed so as to have the positive lens G2 of which the image side surface is a concave surface, and the negative lens G1 disposed on the object side thereof, whereby there is realized an imaging lens system which has a wide angle of view and yet has had its distortion and curvature of image field corrected well.

Also, the rear lens component RL is comprised, in succession from the object side, of a meniscus-shaped negative lens G3 having its concave surface facing the object side, a meniscus-shaped positive lens G4 having its convex surface facing the image side, and a positive lens G5. As described above, the rear lens component RL is comprised of the negative meniscus lens G3 having its concave surface facing the object side and the two positive lenses G4 and G5, whereby it becomes possible to decrease asymmetric blur ("Kataboke" in Japanese) due to the relative decentration of the negative lens G3 and the positive lens G4.

The negative lens G3 of the rear lens component RL is formed of a material of which the refractive index Nd is 1.86 or greater and the Abbe number νd is less than 23. Thereby, a material having a small Abbe number can be selected for the positive lenses in the lens system and therefore, it becomes possible to correct the chromatic aberration of the entire system and yet increase the refractive indices of the positive lenses. As the result, it becomes possible to realize an imaging lens system which suffers little from curvature of image field and which is compact and has a wide angle.

Also, each of the front lens component FL and the rear lens component RL is given an aspheric surface to thereby realize an imaging lens system having a wide angle of view and yet having had its distortion and curvature of image field corrected well.

Further, in the present embodiment, the rear lens component RL is moved to thereby effect focusing. In this case, the front lens component FL or the aperture stop SP is made stationary to thereby realize a stout and compact imaging lens.

In the imaging lens systems shown in the first, second, third and fifth numerical embodiments, there can be carried out a rear focus process in which the front lens component FL is made stationary and the aperture stop SP and the rear lens component RL are moved integrally with each other, a focus process in which the aperture stop SP is made stationary and the front lens component FL and the rear lens component RL are moved integrally with each other, and a rear focus process in which both of the front lens component FL and the aperture stop SP are made stationary and only the rear lens component RL is moved.

Also, when the interval between the negative lens G1 and positive lens G2 of the front lens component FL is defined as L1 and the composite focal length of the entire imaging lens system is defined as f, each lens component is made into an appropriate construction so as to satisfy in the present embodiment, the condition that $$0.00 < L1/f < 0.17, \tag{1}$$

thereby realizing a compact wide angle lens. It is more preferable that the upper limit of conditional expression (1) be 0.12.

Also, when the paraxial radius of curvature of the image side surface of the negative lens G1 of the front lens component FL is defined as R1b, and the paraxial radius of curvature of the object side surface of the positive lens G2 of the front lens component FL is defined as R2a, the respective lenses are constructed so as to satisfy the condition that $$0.20 < R1b/R2a < 0.95. \tag{2}$$

By satisfying conditional expression (2), it becomes possible to bring the marginal edge portion of the outer diameter of the object side surface of the positive lens G2 into marginal contact with the image side surface of the negative lens G1 without making the lens diameters of the negative lens G1 and the positive lens G2 large. By this marginal contact, it becomes possible to decrease the error of the interval between the negative lens G1 and the positive lens G2, and the decrease the occurrence of coma and the deviation of the focal length due to a manufacturing error.

If the value of R1b/R2a exceeds the upper limit of conditional expression (2), the occurrence of coma will become great, and this is not good. On the other hand, if the value of R1b/R2a is below the lower limit of conditional expression (2), the occurrence of spherical aberration will become great, and this is not good. It is more preferable in the correction of coma that the upper limit of conditional expression (2) be 0.85, and further preferably 0.75, and it is more preferable in the correction of spherical aberration that the lower limit of conditional expression (2) be 0.35, and further preferably 0.5.

The imaging lens systems of the first to third numerical embodiments shown in FIGS. 1, 3 and 5 are examples in which the marginal edge portion of the positive lens G2 is brought into marginal contact with the image side surface of the negative lens G1. In the imaging lens system of the fourth numerical embodiment shown in FIG. 7, the negative lens G1 and the positive lens G2 are not brought into contact with each other, and in the fifth numerical embodiment shown in FIG. 9, conversely the marginal edge portion of the inner diameter of the negative lens G1 is brought into marginal contact with the object side surface of the positive lens G2. As described above, whether the two lenses are to be brought into marginal contact with each other can be suitably selected depending on requirements in manufacture and optical performance.

Also, when the paraxial radius of curvature of the object side surface of the positive lens G2 of the front lens component FL is defined as R2a, and the paraxial radius of curvature of the image side surface thereof is defined as R2b, the positive lens G2 is constructed so as to satisfy the condition that $$-1.00 < (R2a-R2b)/(R2a+R2b) < 0.00. \tag{3}$$

Conditional expression (3) prescribes the shape of the positive lens G2, and if the value of (R2a−R2b)/(R2a+R2b) is below the lower limit thereof, the image side surface of the positive lens G2 will assume a shape having its convex surface facing the image side and asymmetric blur due to the decentration error of the positive lens G2 will become great, and this is not good. On the other hand, if the value of (R2a−R2b)/(R2a+R2b) exceeds the upper limit of conditional expression (3), the correction of distortion will become difficult, and this is not good. It is more preferable in obtaining the above-described effect that the upper limit of conditional expression (3) be −0.2, and further preferably −0.4.

Also, when the paraxial radius of curvature of the object side surface of the negative lens G3 of the rear lens component RL is defined as R3a, and the paraxial radius of curvature of the image side surface thereof is defined as R3b, the negative lens G3 is constructed so as to satisfy the condition that $$-1.00 < (R3a-R3b)/(R3a+R3b) < 0.00. \tag{4}$$

Conditional expression (4) prescribes the shape of the negative lens G3, and if the value of (R3a−R3b)/(R3a+R3b) is below the lower limit thereof, the image side surface of the negative lens G3 will assume a shape having its concave surface facing the image side, and asymmetric blur due to the decentration error of the negative lens G3 will become great, and this is not good. On the other hand, if the value of (R3a−R3b)/(R3a+R3b) exceeds the upper limit of conditional expression (4), the correction of spherical aberration will become difficult, and this is not good. It is more preferable in obtaining the above-described effect that the upper limit of conditional expression (4) be −0.2, and further preferably −0.4.

Also, when the paraxial radius of curvature of the object side surface of the positive lens G4 of the rear lens component RL is defined as R4a, and the paraxial radius of curvature of the image side surface thereof is defined as R4b, the positive lens G4 is constructed so as to satisfy the condition that $$0.00 < (R4a-R4b)/(R4a+R4b) < 1.00. \tag{5}$$

Conditional expression (5) prescribes the shape of the positive lens G4, and if the value of (R4a−R4b)/(R4a+R4b) exceeds the upper limit thereof, the object side surface of the positive lens G4 will assume a shape having its convex surface facing the object side, and the asymmetric blur due to the decentration error of the positive lens G4 will become great, and this is not good. On the other hand, if the value of (R4a−R4b)/(R4a+R4b) is below the lower limit of conditional expression (5), the correction of spherical aberration will become difficult, and this is not good. It is more preferable in obtaining the above-described effect that the lower limit of conditional expression (5) be 0.2, and further preferably 0.4.

Also, when the focal length of the front lens component FL is defined as f1, the respective lens components are constructed so as to satisfy the condition that $$-0.20 < f/f1 < 0.60. \tag{6}$$

Conditional expression (6) relates to the power of the front lens component FL, and if the positive power becomes too strong beyond the upper limit thereof, the back focal length will become short and the position of the exit pupil will become close to the image plane, and this is not good. On the other hand, if the negative power becomes too strong beyond the lower limit of conditional expression (6), the back focal length will become too long and it will become difficult to make the entire system compact, and this is not good. It is more preferable that the upper limit of conditional expression (6) be 0.4, and further preferably 0.2, and it is more preferable that the lower limit thereof be −0.1, and further preferably 0.0.

Also, when the height at which a predetermined on-axis ray passes through that surface of the front lens component FL which is most adjacent to the object side is defined as ha, and the height at which the same on-axis ray passes that surface of the front lens component FL which is most adjacent to the image side is defined as hb, the respective lens components are constructed so as to satisfy the condition that $$0.70 < ha/hb < 1.30. \tag{7}$$

Conditional expression (7) is concerned in the angular magnification of the front lens component FL, and if the value of ha/hb exceeds the upper limit thereof, the focal length of the rear lens component RL must be made short, and the correction of curvature of image field will become difficult, and this is not good. On the other hand, if the value of ha/hb is below the lower limit of conditional expression (7), distortion occurring in the front lens component FL will become great, and this is not good. It is more preferable in obtaining the above-described effect that the upper limit of conditional expression (7) be 1.20 and the lower limit thereof be 0.8, and further preferably 0.9.

The imaging lens systems of the first to fifth numerical embodiments described in the present embodiment satisfy the above-mentioned conditional expressions (1) to (7) at a time, but the effects described in the respective conditional expressions are independently obtained by the respective conditional expressions being satisfied. Accordingly, in the imaging lens system of the present invention, all the conditions need not always be satisfied at a time, but necessary conditions can be suitably selected depending on the required specification of the imaging lens system.

The numerical data of the imaging lens systems of the first to fifth numerical embodiments will be shown below.

In each numerical embodiment, f represents the focal length, FNo represents F number, ω represents a half angle of view, ri represents the radius of curvature of the ith surface from the object side, di represents the thickness or the air space of the ith optical member from the object side, and ni and νi represent the refractive index and Abbe number, respectively, of the ith optical member from the object side.

The aspheric shape is expressed by the following expression when k is a cone coefficient, and B, C, D and E are aspheric surface coefficients, and h is the height from the optical axis.

$$X = \frac{(h^2/R)}{1 + \{1 - (1+k)(h/R)^2\}^{1/2}} + Bh^4 + Ch^6 + Dh^8 + Eh^{10}$$

First Numerical Embodiment

| f = 10.00 | | FNo = 1:2.88 | | 2ω = 58.6° | |
|---|---|---|---|---|---|
| r 1 = 22.537 | | d 1 = 1.26 | n 1 = 1.58313 | ν 1 = 59.4 | |
| r 2 = 4.856 | aspheric | d 2 = 0.70 | | | |
| r 3 = 7.452 | surface | d 3 = 2.32 | n 2 = 1.88300 | ν 2 = 40.8 | |
| r 4 = 77.480 | | d 4 = 2.25 | | | |
| r 5 = ∞ | | d 5 = 2.21 | | | |
| r 6 = ∞ | | d 6 = 0.88 | | | |
| r 7 = −5.057 | | d 7 = 0.70 | n 3 = 1.92286 | ν 3 = 18.9 | |
| r 8 = −20.075 | | d 8 = 2.96 | n 4 = 1.88300 | ν 4 = 40.8 | |
| r 9 = −6.202 | | d 9 = 0.13 | | | |
| r 10 = 12.133 | | d 10 = 2.62 | n 5 = 1.69350 | ν 5 = 53.2 | |
| r 11 = −88.411 | aspheric | d 11 = 2.53 | | | |
| r 12 = ∞ | surface | d 12 = 2.79 | n 6 = 1.51633 | ν 6 = 64.1 | |
| r 13 = ∞ | | | | | | aspheric surface coefficient

| | k | B | C | D | E |
|---|---|---|---|---|---|
| second surface | −3.7863e−01 | −1.6581e−04 | 1.6435e−05 | −1.8394e−06 | 6.1707e−08 |
| eleventh surface | −3.0379e+02 | 2.0133e−04 | 4.7595e−07 | −2.1844e−08 | 3.0723e−10 |

Second Numerical Embodiment

| f = 10.00 | | FNo = 1:2.88 | | 2ω = 58.7° | |
|---|---|---|---|---|---|
| r 1 = 12.080 | | d 1 = 1.27 | n 1 = 1.58313 | ν 1 = 59.4 | |
| r 2 = 4.402 | aspheric | d 2 = 0.89 | | | |
| r 3 = 6.819 | surface | d 3 = 2.16 | n 2 = 1.88300 | ν 2 = 40.8 | |
| r 4 = 24.087 | | d 4 = 2.40 | | | |
| r 5 = ∞ | | d 5 = 2.21 | | | |
| r 6 = ∞ | | d 6 = 0.70 | | | |
| r 7 = −5.069 | | d 7 = 0.70 | n 3 = 1.92286 | ν 3 = 18.9 | |
| r 8 = −22.578 | | d 8 = 2.95 | n 4 = 1.88300 | ν 4 = 40.8 | |
| r 9 = −6.260 | | d 9 = 0.13 | | | |
| r 10 = 11.375 | | d 10 = 2.80 | n 5 = 1.69350 | ν 5 = 53.2 | |
| r 11 = −80.314 | aspheric | d 11 = 2.53 | | | |
| r 12 = ∞ | surface | d 12 = 2.80 | n 6 = 1.51633 | ν 6 = 64.1 | |
| r 13 = ∞ | | | | | | aspheric surface coefficient

| | k | B | C | D | E |
|---|---|---|---|---|---|
| second surface | −4.0960e−01 | −1.1475e−04 | 1.9874e−05 | −2.1131e−06 | 7.4768e−08 |
| eleventh surface | −2.2560e+02 | 2.3035e−04 | −4.3102e−07 | −9.0760e−11 | −3.3782e−11 |

Third Numerical Embodiment

| f = 10.00 | | FNo = 1:2.88 | | 2ω = 58.9° | |
|---|---|---|---|---|---|
| r 1 = 11.479 | | d 1 = 1.27 | n 1 = 1.58313 | ν 1 = 59.4 | |
| r 2 = 4.156 | aspheric | d 2 = 1.02 | | | |
| r 3 = 6.918 | surface | d 3 = 2.18 | n 2 = 1.88300 | ν 2 = 40.8 | |
| r 4 = 27.081 | | d 4 = 2.38 | | | |
| r 5 = ∞ | | d 5 = 2.20 | | | |
| r 6 = ∞ | | d 6 = 0.52 | | | |
| r 7 = −5.756 | | d 7 = 0.70 | n 3 = 1.84666 | ν 3 = 23.9 | |
| r 8 = 191.732 | | d 8 = 3.38 | n 4 = 1.77250 | ν 4 = 49.6 | |
| r 9 = −6.414 | | d 9 = 0.13 | | | |
| r 10 = 11.399 | | d 10 = 2.55 | n 5 = 1.66910 | ν 5 = 55.4 | |
| r 11 = −93.263 | aspheric | d 11 = 2.54 | | | |
| r 12 = ∞ | surface | d 12 = 2.81 | n 6 = 1.51633 | ν 6 = 64.1 | |
| r 13 = ∞ | | | | | | aspheric surface coefficient

| | k | B | C | D | E |
|---|---|---|---|---|---|
| second surface | −4.6079e−01 | −7.1020e−05 | 1.9615e−05 | −2.0601e−06 | 7.2364e−08 |
| eleventh surface | −2.2565e+02 | 2.4425e−04 | −8.6422e−07 | 8.4801e−09 | −1.3355e−11 |

Fourth Numerical Embodiment

| f = 10.00 | | FNo = 1:2.88 | | 2ω = 58.7° | |
|---|---|---|---|---|---|
| r 1 = 9.774 | | d 1 = 1.27 | n 1 = 1.58313 | ν 1 = 59.4 | |
| r 2 = 4.237 | aspheric | d 2 = 0.72 | | | |
| r 3 = 6.031 | surface | d 3 = 2.38 | n 2 = 1.88300 | ν 2 = 40.8 | |
| r 4 = 17.869 | | d 4 = 2.38 | | | |
| r 5 = ∞ | | d 5 = 1.01 | | | |
| r 6 = ∞ | | d 6 = 0.68 | | | |
| r 7 = −4.673 | | d 7 = 0.70 | n 3 = 1.92286 | ν 3 = 18.9 | |
| r 8 = −23.842 | | d 8 = 3.02 | n 4 = 1.88300 | ν 4 = 40.8 | |
| r 9 = −6.165 | | d 9 = 0.13 | | | |
| r 10 = 11.685 | | d 10 = 2.75 | n 5 = 1.74330 | ν 5 = 49.3 | |
| r 11 = −60.196 | aspheric | d 11 = 2.54 | | | |
| r 12 = ∞ | surface | d 12 = 2.80 | n 6 = 1.51633 | ν 6 = 64.1 | |
| r 13 = ∞ | | | | | | aspheric surface coefficient

| | k | B | C | D | E |
|---|---|---|---|---|---|
| second surface | −3.7226e−01 | −1.4252e−04 | 1.9507e−05 | −2.1007e−06 | 7.4254e−08 |
| eleventh surface | −2.2557e+02 | 1.8293e−04 | −2.6743e−08 | −1.5786e−09 | −6.9053e−11 |

Fifth Numerical Embodiment

| f = 10.00 | | FNo = 1:2.88 | | 2ω = 58.7° | |
|---|---|---|---|---|---|
| r 1 = 18.284 | | d 1 = 1.27 | n 1 = 1.58313 | ν 1 = 59.4 | |
| r 2 = 4.684 | aspheric | d 2 = 0.78 | | | |
| r 3 = 7.251 | surface | d 3 = 2.28 | n 2 = 1.88300 | ν 2 = 40.8 | |
| r 4 = 51.396 | | d 4 = 2.27 | | | |
| r 5 = ∞ | | d 5 = 2.22 | | | |
| r 6 = ∞ | | d 6 = 0.68 | | | |
| r 7 = −4.991 | | d 7 = 0.70 | n 3 = 1.92286 | ν 3 = 18.9 | |
| r 8 = −14.303 | | d 8 = 3.08 | n 4 = 1.77250 | ν 4 = 49.6 | |
| r 9 = −5.840 | | d 9 = 0.13 | | | |
| r 10 = 11.084 | | d 10 = 2.65 | n 5 = 1.69350 | ν 5 = 53.2 | |

-continued

| r 11 = −138.751 | aspheric surface | d 11 = 2.53 | | | |
|---|---|---|---|---|---|
| r 12 = ∞ | | d 12 = 2.80 | n 6 = 1.51633 | v 6 = 64.1 | |
| r 13 = ∞ aspheric surface coefficient | | | | | |

| | k | B | C | D | E |
|---|---|---|---|---|---|
| second surface | −4.3185e−01 | −1.1914e−04 | 2.0002e−05 | −2.1183e−06 | 7.5014e−08 |
| eleventh surface | k | B | C | D | E |
| | −2.2562e+02 | 2.9035e−04 | −6.1290e−07 | 1.8758e−09 | −3.0797e−11 |

The values of the conditional expressions (1) to (7) of the respective numerical embodiments will be shown below.

TABLE 1

| Conditional expression | Numerical embodiment | | | | |
|---|---|---|---|---|---|
| | 1 | 2 | 3 | 4 | 5 |
| (1) | 0.07 | 0.09 | 0.10 | 0.07 | 0.08 |
| (2) | 0.65 | 0.65 | 0.60 | 0.70 | 0.65 |
| (3) | −0.82 | −0.56 | −0.59 | −0.50 | −0.75 |
| (4) | −0.60 | −0.63 | −1.06 | −0.67 | −0.48 |
| (5) | 0.53 | 0.57 | 1.07 | 0.59 | 0.42 |
| (6) | 0.21 | 0.19 | 0.17 | 0.31 | 0.21 |
| (7) | 1.00 | 1.03 | 1.01 | 1.10 | 1.00 |

An embodiment of a digital still camera (image taking apparatus) provided with one of the imaging lens systems of the first to fifth numerical embodiments will now be described with reference to FIGS. 11A and 11B.

Figure 11A:
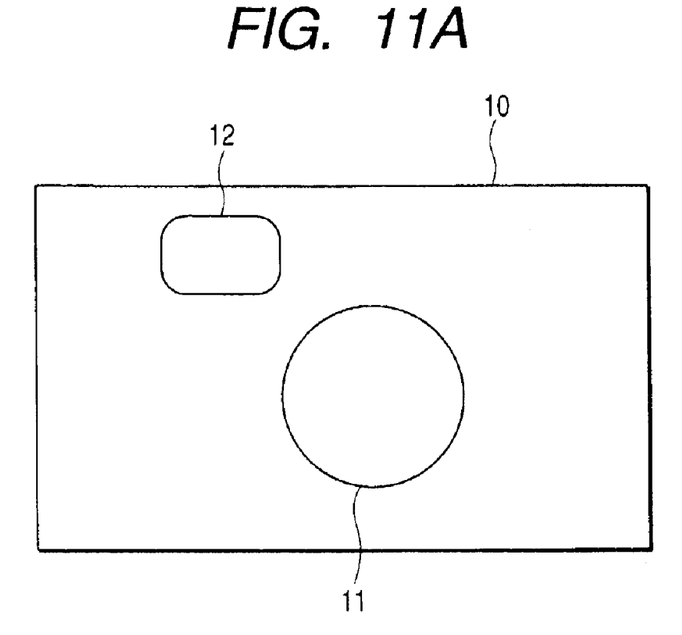
FIGS. 11A and 11B schematically show the construction of an image taking apparatus.
Figure 11B:
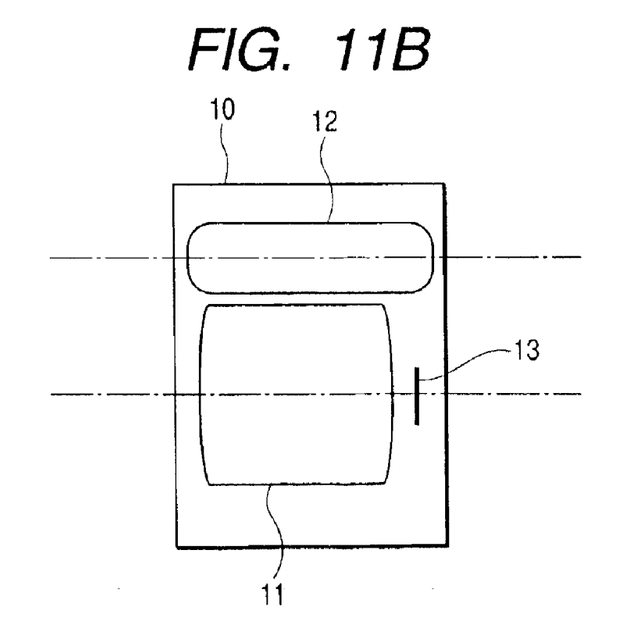

FIG. 11A is a front view of the digital still camera, and FIG. 11B is a side cross-sectional view thereof. In these figures, the reference numeral 10 designates the main body (housing) of the digital still camera, the reference numeral 11 denotes a photographing optical system using one of the imaging lens systems of the first to fifth numerical embodiments, the reference numeral 12 designates a finder optical system, and the reference numeral 13 denotes a solid state image pickup element (photoelectric conversion element such as a CCD sensor or a CMOS sensor).

By applying one of the imaging lens systems of the first to fifth numerical embodiments to the photographing optical system of the digital still camera as described above, it is possible to realize a compact image taking apparatus having good performance.

What is claimed is:

1. An imaging lens system comprising:
   a front lens component disposed forwardly of an aperture stop, the front lens component having a positive lens of which the rear surface is a concave surface, and a negative lens disposed forwardly thereof; and
   a rear lens component of positive power disposed rearwardly of the aperture stop;
   wherein in case of focusing, at least one of the front lens component and the aperture stop is not moved, but the rear lens component is moved and a forefront or backmost lens of the image lens system is an aspherical lens.

2. An imaging lens system comprising:
   a front lens component disposed forwardly of an aperture stop, the forefront lens of the front lens component being an aspherical lens; and
   a rear lens component of positive power disposed rearwardly of the aperture stop, the backmost lens of the rear lens component being an aspherical lens;
   wherein in case of focusing, at least one of the front lens component and the aperture stop is not moved, but the rear lens component is moved and,
   when the interval between the negative lens of the front lens component and the positive lens of the front lens component is defined as L1, and the composite focal length of the entire system is defined as f, the condition that $0.00 < L1/f < 0.17$ is satisfied.

3. An imaging lens system comprising:
   a front lens component disposed forwardly of an aperture stop, wherein the front lens component includes a plurality of lenses, only one of which is a positive lens; and
   a rear lens component of positive power disposed rearwardly of the aperture stop, the rear lens component having, in succession from the front to the rear, a meniscus negative lens having its concave surface facing the object side, a positive lens and a positive lens;
   wherein in case of the focusing, at least one of the front lens component and the aperture stop is not moved, but the rear lens component is moved.

4. An imaging lens system comprising:
   a front lens component disposed forwardly of an aperture stop; and
   a rear lens component of positive power disposed rearwardly of the aperture stop, the rear lens component having, in succession from the front to the rear, a negative lens, a meniscus positive lens having its convex surface facing the image side, and a positive lens;
   wherein in case of focusing, at least one of the front lens component and the aperture stop is not moved, but the rear lens component is moved and a forefront or backmost lens of the image lens system is an aspherical lens.

5. An imaging lens system comprising:
   a front lens component disposed forwardly of an aperture stop, the front lens component having a positive lens and a negative lens disposed forwardly thereof; and
   a rear lens component of positive power disposed rearwardly of the aperture stop;
   wherein at least one of the front or the rear lens component has an aspherical surface and
   wherein in case of focusing, at least one of the front lens component and the aperture stop is not moved, but the rear lens component is moved, and
   when the interval between the negative lens of the front lens component and the positive lens of the front lens component is defined as L1, and the composite focal length of the entire system is defined as f, the condition that $0.00 < L1/f < 0.17$ is satisfied.

6. An imaging lens system comprising:
   a front lens component disposed forwardly of an aperture stop, the front lens component having a positive lens of which the rear surface is a concave surface, and a negative lens disposed forwardly thereof; and a rear lens component of positive power disposed rearwardly of the aperture stop; and when the interval between the negative lens of the front lens component and the positive lens of the front lens component is defined as L1, and the composite focal length of the entire system is defined as f, the condition that $$0.00 < L1/f < 0.17$$

is satisfied, and a forefront or backmost lens of the image lens system is an aspherical lens.

7. An imaging lens system comprising:

a front lens component disposed forwardly of an aperture stop, the front lens component having a positive lens and a negative lens disposed forwardly thereof and of which the rear surface is an aspheric surface; and a rear lens component of positive power disposed rearwardly of the aperture opening, the rear lens component having, in succession from the front to the rear, a negative lens, a positive lens and a positive lens of which the rear surface is an aspheric surface; and when the interval between the negative lens of the front lens component and the positive lens of the front lens component is defined as L1, and the composite focal length of the entire system is defined as f, the condition that $$0.00 < L1/f < 0.17$$

is satisfied.

8. An imaging lens system comprising:

a front lens component disposed forwardly of an aperture stop, the front lens component having a positive lens and a negative lens disposed forwardly thereof; and a rear lens component of positive power disposed rearwardly of the aperture stop, the rear lens component having, in succession from the front to the rear, a meniscus negative lens having its concave surface facing forwardly, a positive lens and a positive lens; and when the interval between the negative lens of the front lens component and the positive lens of the front lens component is defined as L1, and the composite focal length of the entire system is defined as f, the condition that $$0.00 < L1/f < 0.17$$

is satisfied.

9. An imaging lens system comprising:

a front lens component disposed forwardly of an aperture stop, the front lens component having a positive lens and a negative lens disposed forwardly thereof; and a rear lens component of positive power disposed rearwardly of the aperture stop, the rear lens component having, in succession from the front to the rear, a negative lens, a meniscus positive lens having its convex surface facing the image side, and a positive lens; and when the interval between the negative lens of the front lens component and the positive lens of the front lens component is defined as L1, and the composite focal length of the entire system is defined as f, the condition that $$0.00 < L1/f < 0.17$$

is satisfied.

10. An imaging lens system comprising:

a front lens component disposed forwardly of an aperture stop; and a rear lens component of positive power disposed rearwardly of the aperture stop, the number of negative lens that the rear lens component has being one;

wherein when the refractive index of the negative lens of the rear lens component is defined as Nd and the Abbe number thereof is defined as vd, $$Nd \geq 1.86$$

$$vd < 23.$$

11. An imaging lens system comprising:

a front lens component disposed forwardly of an aperture stop, the front lens component having a positive lens and a negative lens disposed forwardly thereof, a marginal edge portion of the front surface of the positive lens being brought into contact with the rear surface of the negative lens; and a rear lens component of positive power disposed rearwardly of the aperture stop; and when the interval between the negative lens of the front lens component and the positive lens of the front lens component is defined as L1, and the composite focal length of the entire system is defined as f, and the paraxial radius of curvature of the rear surface of the negative lens of the front lens component is defined as R1$b$, and the paraxial radius of curvature of the front surface of the positive lens of the front lens component is defined as R2$a$, the conditions that $$0.00 < L1/f < 0.17$$

$$0.20 < R1b/R2a < 0.95$$

are satisfied.

12. An image taking apparatus comprising:
an imaging lens system according to claim 1; and
a solid state image pickup element for receiving an image formed by the imaging lens.

13. An image taking apparatus comprising:
an imaging lens system according to claim 2; and
a solid state image pickup element for receiving an image formed by the imaging lens.

14. An image taking apparatus comprising:
an imaging lens system according to claim 3; and
a solid state image pickup element for receiving an image formed by the imaging lens.

15. An image taking apparatus comprising:
an imaging lens system according to claim 4; and
a solid state image pickup element for receiving an image formed by the imaging lens.

16. An image taking apparatus comprising:
an imaging lens system according to claim 5; and
a solid state image pickup element for receiving an image formed by the imaging lens.

17. An image taking apparatus comprising:
an imaging lens system according to claim 6; and
a solid state image pickup element for receiving an image formed by the imaging lens.

18. An image taking apparatus comprising:
an imaging lens system according to claim 7; and
a solid state image pickup element for receiving an image formed by the imaging lens.

19. An image taking apparatus comprising:
an imaging lens system according to claim 8; and
a solid state image pickup element for receiving an image formed by the imaging lens.

20. An image taking apparatus comprising:
an imaging lens system according to claim 9; and
a solid state image pickup element for receiving an image formed by the imaging lens.

21. An image taking apparatus comprising:
an imaging lens system according to claim 10; and
a solid state image pickup element for receiving an image formed by the imaging lens.

22. An image taking apparatus comprising:
an imaging lens system according to claim 11; and
a solid state image pickup element for receiving an image formed by the imaging lens.

23. An imaging lens system according to claim 3, wherein the front lens component consists of a negative lens and a positive lens.

* * * * *